United States Patent [19]

Feldman et al.

[11] Patent Number: 5,290,398
[45] Date of Patent: Mar. 1, 1994

[54] SYNTHESIS OF TAPERS FOR FIBER OPTIC SENSORS

[75] Inventors: Sandra F. Feldman; Emily Y. Shu; John Y. Gui, all of Schenectady, N.Y.

[73] Assignee: General Electric Company, Schenectady, N.Y.

[21] Appl. No.: 993,751

[22] Filed: Dec. 21, 1992

[51] Int. Cl.$^5$ .......................... B05D 1/00; C03C 25/00
[52] U.S. Cl. ................................ 156/651; 156/662; 156/663; 156/345; 65/31
[58] Field of Search ............... 156/663, 662, 651, 345; 65/31

[56] References Cited

U.S. PATENT DOCUMENTS

| | | | |
|---|---|---|---|
| 1,260,395 | 3/1918 | Keller | 156/651 |
| 4,265,699 | 5/1981 | Ladany | 156/663 X |
| 4,469,554 | 9/1984 | Turner | 156/657 |
| 4,564,417 | 1/1986 | Schoen et al. | 156/663 X |
| 4,654,532 | 3/1987 | Hirschfeld | 250/458.1 |
| 5,061,857 | 10/1991 | Thompson et al. | 250/458.1 |

OTHER PUBLICATIONS

Crow et al, "Fabrication of Lenses on Tips of Fibers"; IBM Technical Disclosure Bulletin, vol. 20, No. 3, Aug. 1977.
Effect of Numerical Aperture on Signal Level in Cylindrical Waveguide Evanescent Fluorosensors by Thomas R. Glass, Steve Lackie and Tomas Hirshfield, Applied Optics, vol. 26, No. 11, Jun. 1, 1987.
The Effect of Tapering the Optical Fiber on Evanescent Wave Measurements by Lisa C. Shriver-Lake, et al, Naval Research Laboratory, Analytical Letters, 25(7), pp. 1183-1199, 1992.

Primary Examiner—Thi Dang
Attorney, Agent, or Firm—Ann Marie Kratz; Marvin Snyder

[57] ABSTRACT

The end region of a fiber optic sensor is tapered by suspending a fiber in a container. Etchant is added to the container at a controlled rate in order to etch a taper into the fiber. The taper size and shape are controlled by the selection of the size and shape of the container, as well as by the rate of adding etchant to the container.

16 Claims, 6 Drawing Sheets

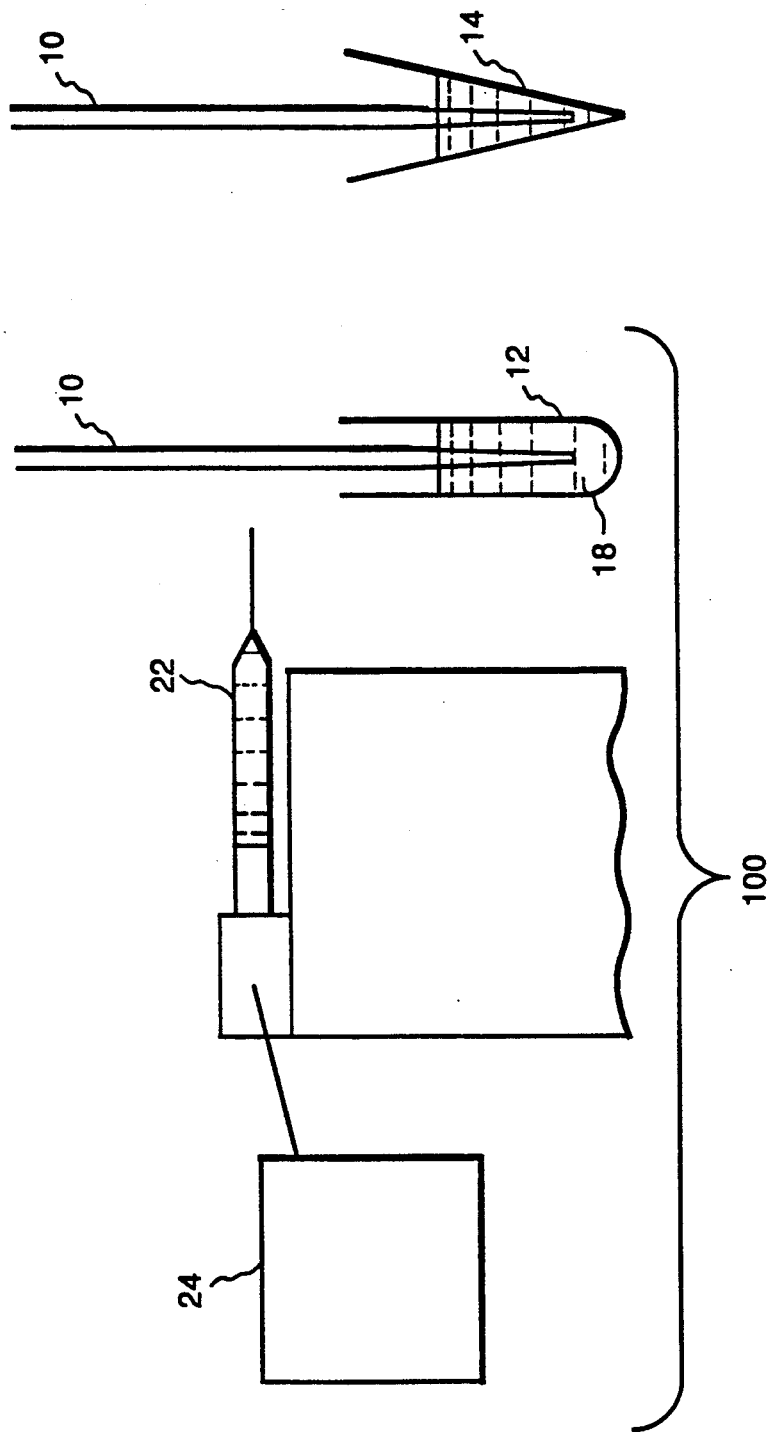

SYNTHESIS OF TAPERS FOR FIBER OPTIC SENSORS

BACKGROUND OF THE INVENTION

1. Field of the Invention

This invention is generally related to tapers in optical fibers, and, more particularly, to a method and apparatus for using an etchant to achieve a desired taper in an optical fiber fluorescence probe.

2. Description of the Related Art

Conventional approaches to tapering fibers such as optical fibers (hereinafter "fibers") are not conducive to large scale production. Several prior approaches have included (a) slowly lowering a fiber into acid to obtain a taper over the desired area, and (b) immersing the region of the fiber to be tapered in an acid and slowly raising it out of the acid. A drawback to these approaches is that they require the fiber to be physically moved during the tapering procedure. During the etching process, even a small angular deviation from the vertical will distort the taper profile. Thus, the apparatus for lowering or lifting a fiber requires great precision and uniformity, especially when multiple fibers are etched simultaneously. It would be desirable to have a system for etching fibers that does not require the fibers to be moved. Another consideration is the safety hazard posed by open containers of acid when acid is used for tapering.

In a fiber optic based laser induced fluorescence sensor (LIFS) probe, a coherent energy field propagates through a fiber to an active region. In the active region, evanescent field excitation leads to a fluorescent signal from an analyte outside the fiber. The fluorescent signal propagates back through the fiber and is used to estimate the concentration of the analyte. The performance of a fiber optic LIFS probe depends on the strength of the evanescent field, the strength of the fluorescent signal returned from the probe, and the number of fluorophores which adhere to the sensor. One approach to enhancing the sensor has been to taper the probe.

The need for precision tapering extends to applications other than the LIFS probe context, which may require individualized taper shapes. Methods for linear and step tapers have been disclosed, but these are only several of the many taper shapes which may be needed for various applications.

SUMMARY OF THE INVENTION

Accordingly, one object of the invention is to provide a method and apparatus for fabricating fiber optic tapers with a specified taper profile in such a manner as to control the surface roughness in these tapers (and therefore, if desired, provide greater surface area so a larger number of fluorophores adhere to the fiber surface) and to allow for large scale manufacture of such fiber optic tapers.

Another object of the present invention is to provide a system of tapering with an etchant which can be sealed for greater safety.

Still another object of the invention is to maximize the detectable fluorescent signal of a laser induced fluorescence sensor probe.

Briefly, according to one embodiment of the invention, a method is provided for tapering the end of a fiber optic sensor by first suspending a fiber in a container and then introducing an etchant into the container in a gradual manner in order to etch a taper out of the fiber.

In another embodiment of the invention, an apparatus for tapering the end of a fiber optic sensor comprises: a container for containing an etchant; means for suspending a fiber in the container; and means for adding etchant to the container in a controlled manner.

In still another embodiment of the invention, a configuration for sensing the concentration of an analyte comprises: a fiber optic, laser induced fluorescence sensor probe having a nonlinearly tapered profile; means for propagating a field through a fiber to an active region; and means for propagating a fluorescent signal from the analyte back through the fiber.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, with like numerals throughout the drawings representing like components throughout the drawings, in which:

FIG. 3(a) is a side view of a syringe pump for adding acid to a container with a fiber suspended;

FIG. 3(b) is a side view of an alternative container which may be used in the same manner as the container shown in FIG. 3(a)

DETAILED DESCRIPTION OF A PREFERRED EMBODIMENT OF THE INVENTION

Figure 1A:
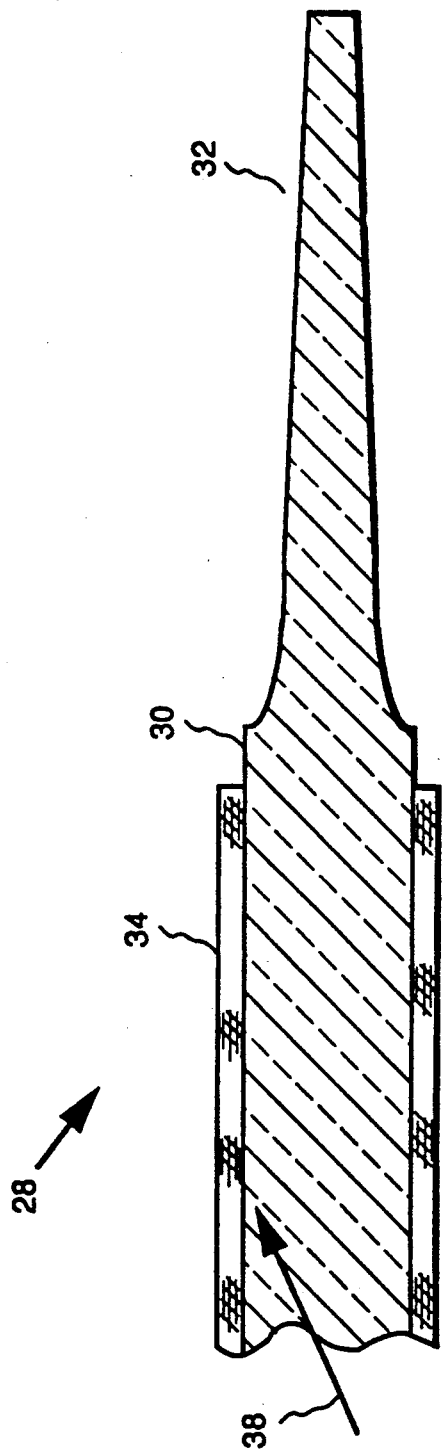
FIG. 1(a) is side view of a nonlinearly tapered fiber.

FIG. 1(a) is a side view of a nonlinearly tapered fiber 30 that may form a portion of a fiber optic laser induced fluorescence sensor (LIFS) probe. An exciting light ray 38, such as produced by a laser (not shown), enters probe 28 through a section of clad fiber 34, which is untapered. In one embodiment, the cladding, which may comprise any suitable material, comprises glass with a lower index of refraction than the fiber core. The end 32 of the probe is tapered and carries no cladding. Cladding may cover either the entire untapered end of the fiber or a portion of the untapered end. The detectable fluorescent signal (not shown) returning through a fiber 30 can be maximized by appropriately shaping the profile of the fiber optic LIFS probe 28. Properly shaping the geometry of the fiber can lead to a stronger evanescent field in the active region of the probe and a stronger florescent signal returned through the probe, thus increasing sensitivity of the sensor.

Figure 1B:
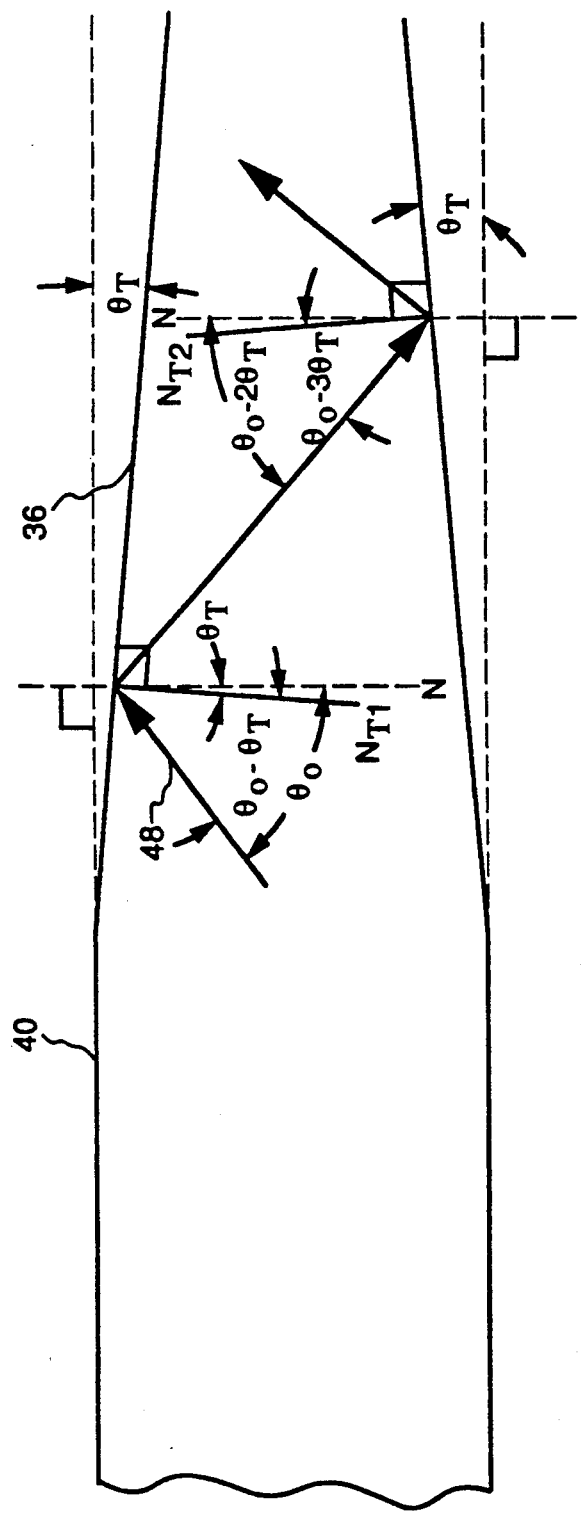
FIG. 1(b) is a side view of a linearly tapered fiber.

FIG. 1(b) is a side view of a linearly tapered fiber 40 and a light ray 48 from a laser (not shown). Light ray 48 is oriented at an angle $\theta_o$ with respect to the normal N to the fiber wall in the untapered region. In the tapered region, the normal $N_{T1}$ to the fiber wall is offset from the normal N to the fiber wall in the untapered region by the taper slope angle $\theta_T$. The angle $(\theta_o - \theta_T)$ that light ray 48 makes with respect to the normal $N_{T1}$ to the tapered fiber wall must equal or exceed the critical angle for that interface in order for the light to have total internal reflection. At the next reflection from tapered wall 36, light ray 48 strikes the wall at an angle $(\theta_o - 3\theta_T)$ with respect to the normal $N_{T2}$ to tapered wall 36. For each reflection, the incidence angle decreases by $2\theta_T$. As the angle of incidence of the light ray in the taper decreases toward the critical angle, the strength of the evanescent field outside the taper increases, leading to a corresponding increase in the induced fluorescent signal from an analyte (not shown) into which the fiber has been inserted and which fluoresces in response to energization by the evanescent field.

As a returning ray (not shown) of the induced fluorescent signal propagates up the fiber taper wall 36 its angle of incidence with the taper wall is increased on each reflection by $2\theta_T$ also. Thus, although the critical angle in the clad region of the fiber is larger than the critical angle for the tapered region of the fiber in air or in aqueous solution, a light ray entering the taper at the tapered region critical angle will gradually increase its angle of incidence along the tapered region of the fiber until it is greater than the critical angle of the clad region of the fiber. It then will be guided when it reaches the untapered and clad fiber section. Thus, the tapering effectively increases the solid angle through which fluorescence may be accepted, guided up the fiber, and returned to a detector (not shown). In one embodiment (not shown), fluorescence is returned to the detector, for example, a photodiode, by using a mirror and optical focusing lenses.

The enhancement in the fiber signal due to the larger evanescent field and the increased acceptance angle for the fluorescence, both of which are a result of the taper, are sufficient to offset the signal decrease caused by the fact that fewer fluorophores may be attached to the fiber surface as the fiber diameter decreases down the taper.

Figure 2A:
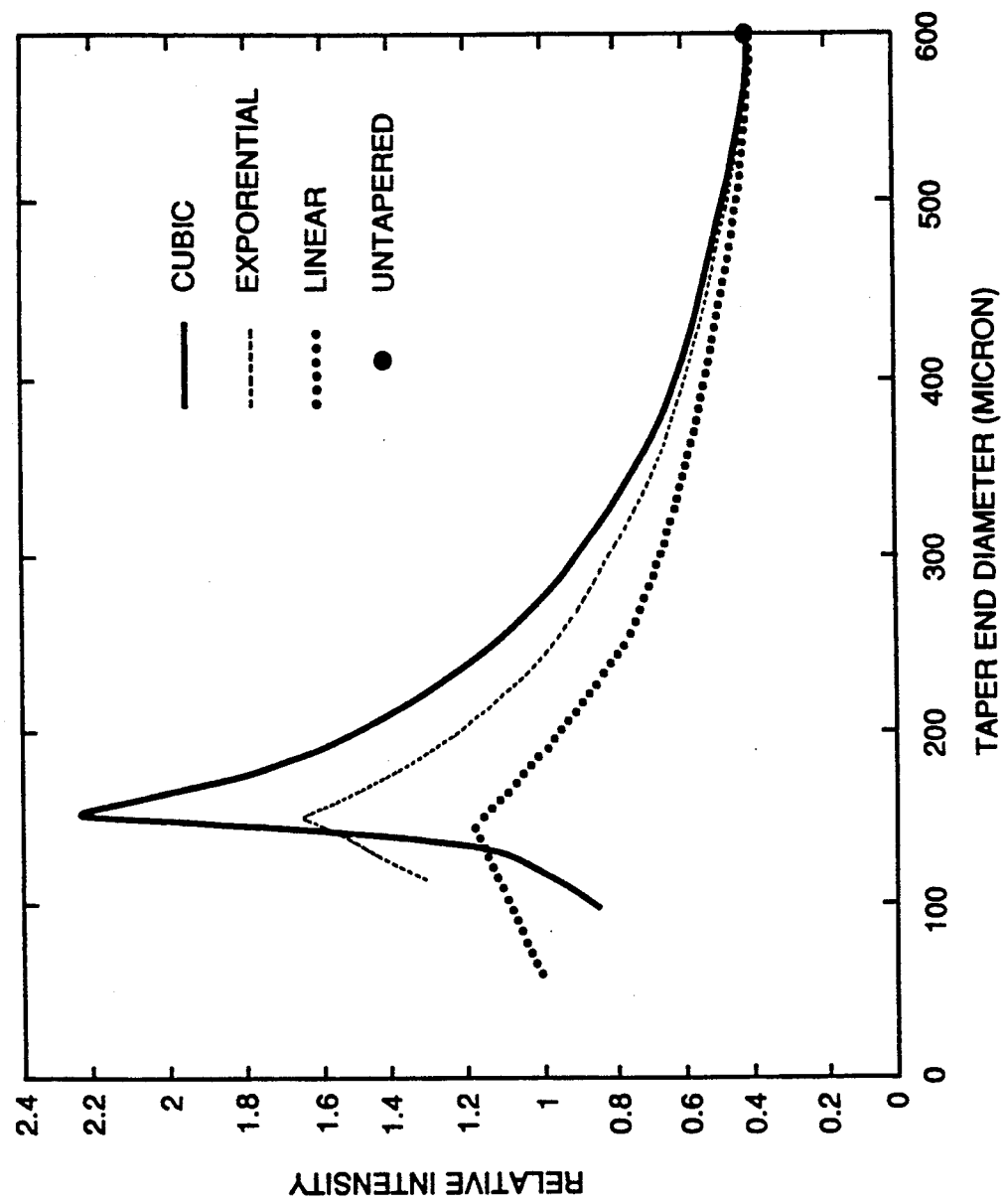
FIGS. 2(a) and 2(b) are graphs representing the results of simulations predicting an increase in the fluorescent signal from tapered fibers.
Figure 2B:
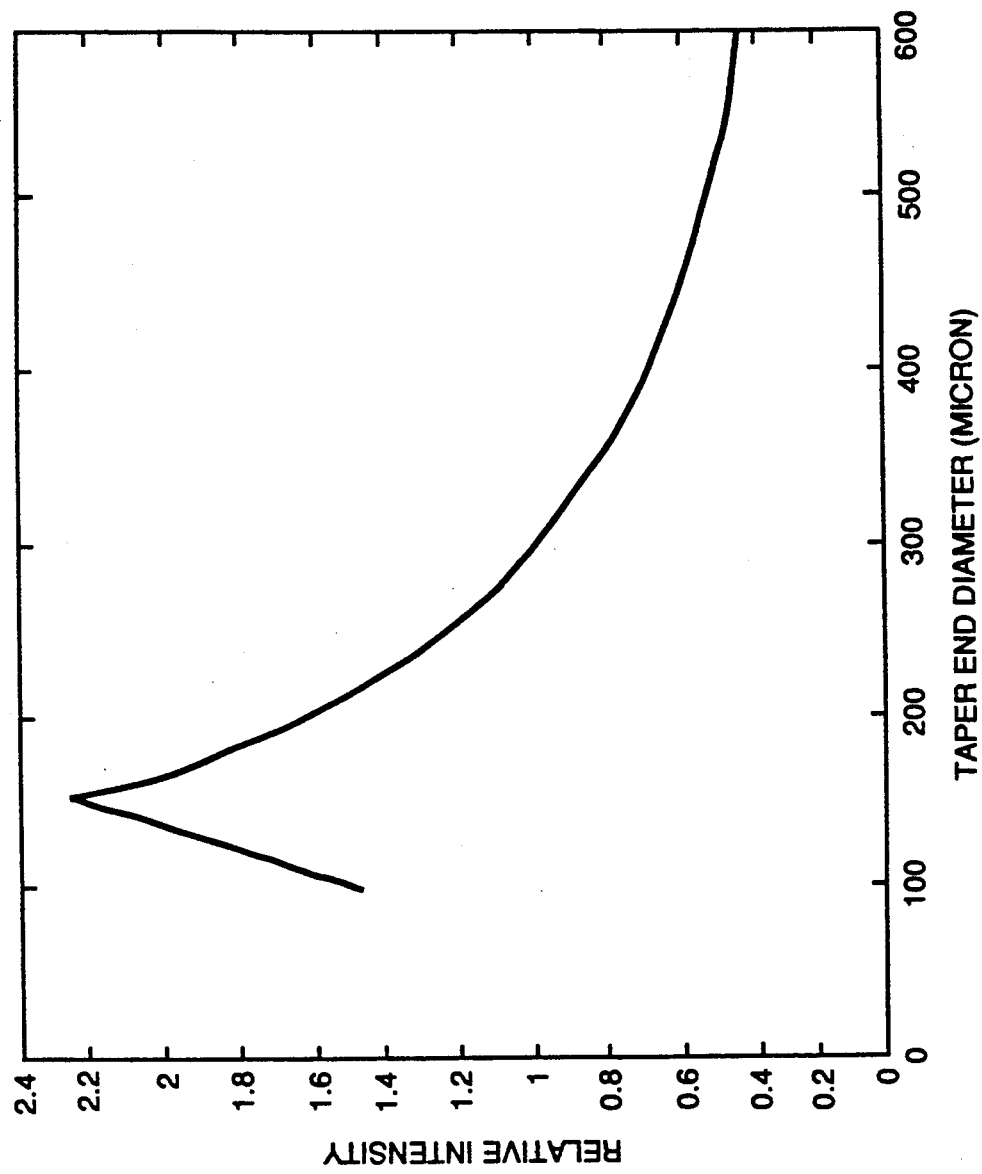

FIGS. 2(a) and 2(b) present the results of simulations predicting an increase in the fluorescent signal for tapered quartz fibers with numerical apertures of 0.22 when detecting a chemical signal in air. These simulations on several representative taper shapes show that a taper with a cubic profile is the most effective, followed by a taper with exponential profile, a linear taper, and an untapered fiber segment. Similar results are expected for the same shaped tapers in liquid, provided the refractive index of the liquid is less than the refractive index of the fiber cladding. The relative intensity of the fluorescent signal expected from the tapers is plotted as a function of the taper end diameter in FIG. 2(a). In each case the initial diameter is 600 microns and the total taper length is 10 cm. The expected signal from an untapered fiber segment is indicated by the single point at an end diameter of 600 microns. Linear, exponential, and cubic taper profiles are indicated on the plot. Using a cubic geometry, a five-fold enhancement in the signal (relative to an untapered fiber) is expected. Other geometries, such as, for example, quadratic profiles, may yield similar signal enhancements. FIG. 2(b) presents the results of a simulation using a more gradual, 15 cm linear taper with only the final 10 cm used for probing.

FIG. 3(a) is a side view of a tapering apparatus 100 including a pump, shown as a syringe pump 22, for adding etchant 18 to a container 12 in order to taper a suspended fiber 10. Fiber 10 is not limited to fibers for use in LIFS probes; the fiber may be glass, plastic, quartz, or any other material that can be chemically etched. The etchant 18 is chosen to best etch the type of fiber used. For glass and quartz fibers, the preferred etchant is hydrofluoric acid. Other possible etchants for glass and quartz include fluoride salts, strong base solutions such as potassium hydroxide in isopropyl alcohol, and any other solutions capable of etching at a reasonable rate.

The selection of container 12 depends on several factors. First, the container must be inert to the chosen etchant 18. Thus when etching a glass fiber, a hydrofluoric acid-resistant plastic container is desirable. When hydrofluoric acid is used, containers such as Teflon polytetrafluoroethylene (Teflon is a trademark of E. I. duPont de Nemours and Co.), Kel-F polychlorotrifluoroethylene (Kel-F is a trademark of 3M Corp.), polypropylene, and polyethylene are appropriate. Another consideration with respect to the container is its shape, as is discussed below.

Syringe pump 22 is not necessarily required by the invention. Any apparatus capable of providing a controlled infusion rate of dripping an appropriate etchant into container 12 will suffice. Sage Instruments manufactures a commercially available syringe pump. Alternatively, a varistaltic pump with computerized drive 24 (Barnant Company is one manufacturer of such drives) can be used. The term "dripping" generally encompasses droplets but, depending on the size of the container, "dripping" may involve a stream of etchant.

When syringe pump 22 does not have optional computer control 24, the rate of infusion will most likely be constant. The shape of the container then determines the final taper profile. A cylindrical container 12, shown in FIG. 3(a), thus leads to a linear taper because the rate of infusion (and thus additional volume) is constant, so the rate of change in height of the etchant is constant. Therefore, the etching occurs at a linear rate with the grade of the taper depending on the rate of flow of the dripping.

Alternatively, a conical container 14, shown in FIG. 3(b), leads to a cubic taper. The cubic aspect of the taper develops because, as acid is added at a constant volumetric rate, the rate of increase in depth of the acid decreases. By machining an appropriately-shaped container, other nonlinear taper profiles (for example quadratic and exponential profiles) may be attained.

If computer control 24 is used, a nonlinear infusion rate of etchant can easily be supplied, if desired, and any specified taper shape can thus be obtained using the same general geometry principles discussed above. The process of programming the computer involves determining the relation $r = f(z)$ between the fiber radius r and height z, and its derivative. If (1) the etch rate $C_e$ is $-dr(z)/\delta t$, with r being the radius of the fiber at height z and t being time; (2) the drip rate $C_d$ is $dz/\delta t$; and (3) the desired profile is $r(z)$, then $C_d = (1/(dr(z)/dz))*(dr(z)/dt) = (1/(dr(z)/dz))*(-C_e)$.

The shape of the taper thus may be controlled by the drip rate, the container shape, or a combination of the two. Therefore, designs for specific applications of the invention are very flexible.

Figure 4:
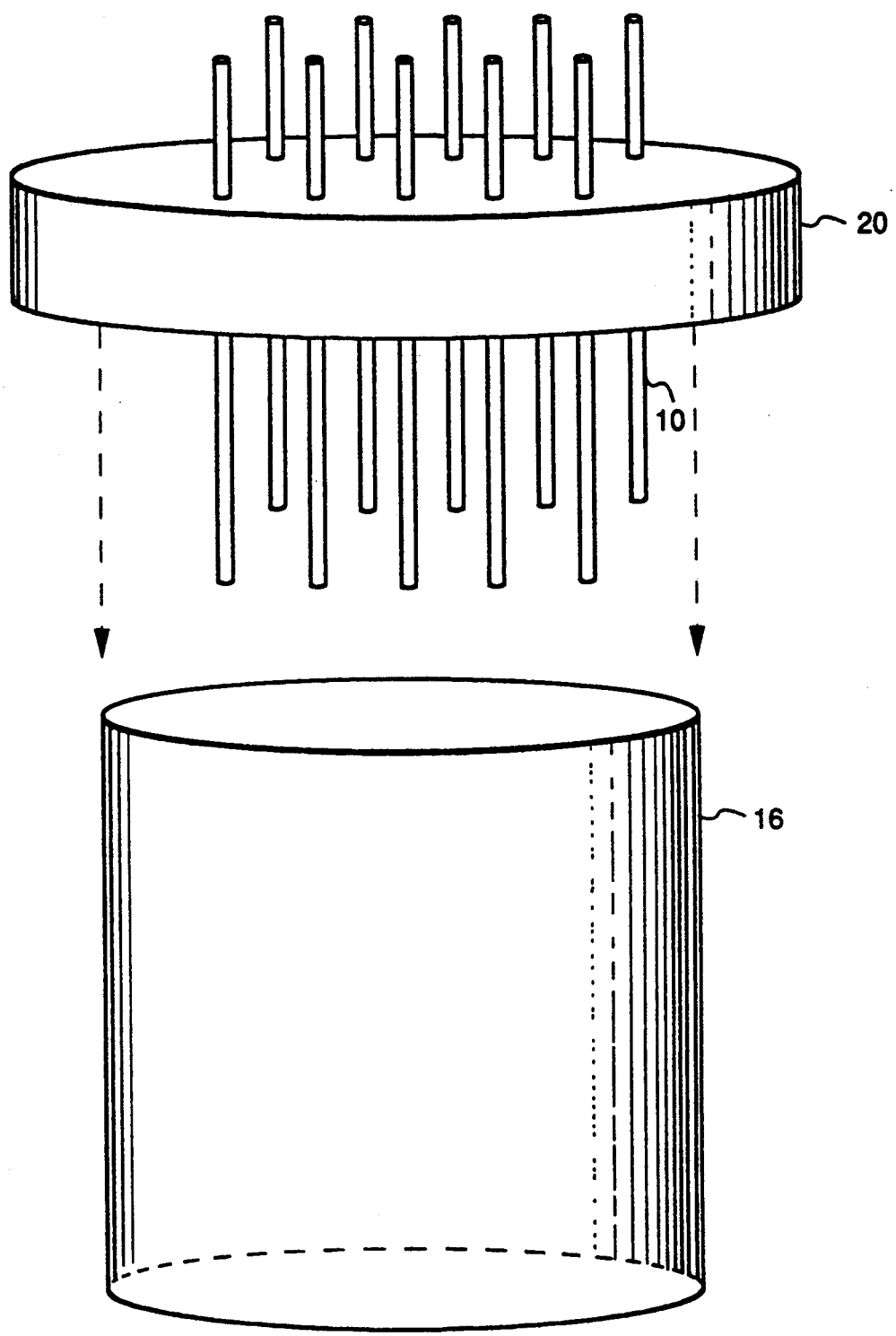
FIG. 4 is a perspective view of the suspension of multiple fibers for insertion into a container.

FIG. 4 is a perspective view of a suspension of multiple fibers 10 for insertion into a container 16. Any gentle (i.e., nonabrasive and low pressure-applying) clip or other means for holding a fiber in place may be used. In a preferred embodiment, a sheet 20 with small holes drilled through it holds fibers 10 which are then lowered into container 16 for etching. Although container 16 is illustrated as being cylindrical, it may be any appropriate shape, as discussed above. Sheet 20 may be comprised of any material that is capable of supporting fibers placed in holes and is inert to the etchant. One appropriate material for use with a hydrofluoric acid etchant is Teflon polytetrafluoroethylene. The sheet should be thick enough to hold all the fibers in parallel. A thickness of about one inch has been found to be satisfactory. An optional adhesive or other material for helping the fibers to remain steady in the sheet may be used. One material that works well with Teflon polytetrafluoroethylene in holding the fibers is silicone (which may be conveniently applied, for example, in resin or film form). In one embodiment, the silicone is smeared around the fibers in the region of the sheet after they have been inserted into the sheet. Then, after the silicone dries, the etching process is begun.

The simplest and safest method of inserting the fibers into the container is to lower the sheet onto the container itself and cause the sheet to seal the etchant in the container. Alternatively the sheet may rest on a stand (not shown) or on some other support device. If a sheet is positioned directly on the container, such placement should leave space, or the sheet or container should contain a hole or tube (not shown), for etchant to be added to the container.

The drip method leads to fiber tapers with a smooth surface. If a rougher surface is desired, the final portion of the etching may be performed with a vapor in any convenient manner. For example, the fibers may be withdrawn from container 16 and placed in a second container (not shown) with a solution of etchant at the bottom creating a vapor in the portion of the container in which the fiber is suspended. Alternatively, depending on the length of the fiber and the depth of container 16, a rough etch may be accomplished simply by raising the position of the fibers until they are no longer in the etchant solution.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for tapering the end of a fiber, comprising the steps of:
   suspending said fiber in a container; and
   providing etchant in said container at a controlled rate in order to etch a taper into said fiber.

2. The method of claim 1, wherein said fiber is selected from the group consisting of glass and quartz.

3. The method of claim 2, wherein said etchant comprises hydrofluoric acid.

4. The method of claim 3, wherein said container comprises plastic.

5. The method of claim 1, further including, as a final step, etching said fiber using an etchant vapor.

6. The method of claim 1, wherein said fiber is suspended in said container through a supporting hole in a sheet.

7. The method of claim 6, wherein said sheet comprises polytetrafluoroethylene, and further including the step of adding silicone about said fiber in the region of said sheet to support said fiber firmly in said supporting hole.

8. The method of claim 6, wherein said sheet is situated against said container.

9. The method of claim 1, wherein the step of providing said etchant in said container is accomplished by dripping said etchant into said container.

10. The method of claim 9, wherein said dripping occurs at a constant infusion rate.

11. The method of claim 10, wherein said container comprises a container selected from the group consisting of cylindrical and conical containers.

12. The method of claim 9, wherein said dripping occurs at a nonlinear infusion rate.

13. A method for tapering the end of a fiber optic sensor, comprising the steps of:
    suspending a fiber, selected from the group consisting of glass and quartz, in a plastic container; and
    dripping hydrofluoric acid into said container in a gradual manner in order to etch a taper into said fiber.

14. The method of claim 13, wherein said dripping occurs at a constant infusion rate.

15. The method of claim 13, wherein said dripping occurs at a nonlinear infusion rate.

16. The method of claim 13, wherein said fiber is suspended in said container through a supporting hole in a sheet.

* * * * *